(12) United States Patent
Desmarais et al.

(10) Patent No.: US 6,478,334 B1
(45) Date of Patent: Nov. 12, 2002

(54) ENERGY-ABSORBING ANCHOR, D-RING, TURNING LOOP OR WEB GUIDE

(75) Inventors: Robert J. Desmarais, Lake Orion, MI (US); Bayard C. Temple, Roseville, MI (US); David R. Arnold, Macomb, MI (US); Richard A. Boelstler, Lake Orion, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/925,791

(22) Filed: Aug. 9, 2001

(51) Int. Cl.⁷ .................................................. B60R 22/28
(52) U.S. Cl. ...................................................... 280/805
(58) Field of Search ............................. 280/805, 801.1, 280/803, 748, 751; 297/468, 470

(56) References Cited

U.S. PATENT DOCUMENTS

| | | | |
|---|---|---|---|
| 4,378,187 A | | 3/1983 | Fullerton |
| 4,480,853 A | * | 11/1984 | Ando et al. ............... 280/801.1 |
| 5,037,135 A | * | 8/1991 | Kotikovsky et al. ...... 280/801.1 |
| 5,324,150 A | | 6/1994 | Fullerton |
| 5,378,100 A | | 1/1995 | Fullerton |
| 5,427,488 A | | 6/1995 | Fullerton |
| 5,529,344 A | * | 6/1996 | Yasui et al. .................. 280/808 |
| 5,580,200 A | | 12/1996 | Fullerton |
| 5,613,816 A | | 3/1997 | Cabahug |
| 5,733,084 A | | 3/1998 | Fullerton |
| 5,788,443 A | | 8/1998 | Cabahug |
| 5,791,687 A | * | 8/1998 | Gotou et al. ................. 280/805 |
| 5,800,108 A | | 9/1998 | Cabahug |

* cited by examiner

Primary Examiner—Paul N. Dickson
Assistant Examiner—Faye M. Fleming
(74) Attorney, Agent, or Firm—Markell Seitzman

(57) ABSTRACT

An energy absorbing web guide assembly comprising: a web guide for slidingly supporting a section of a seat belt; and a pair of mounting fasteners for mounting the web guide to a mounting surface and for permitting the web guide to resiliently move, in response to forces input thereto, between a first position to a second position.

19 Claims, 12 Drawing Sheets

ENERGY-ABSORBING ANCHOR, D-RING, TURNING LOOP OR WEB GUIDE

BACKGROUND AND SUMMARY OF THE INVENTION

The present invention relates generally to anchors for seat belt systems and more particularly to D-rings, web guides and turning loops, which in the art refer to the same physical part, and more particularly to an energy-absorbing anchor.

A conventional web guide includes a metal support plate with a circular mounting opening and a slit through which the shoulder belt is slidingly received. Alternatively, many web guides are formed by a loop of wire, which forms a web support surface. A threaded bolt serves as a mounting member, which is secured to a threaded nut, which functions as a cooperating mounting member. The threaded nut can be part of a vertically adjustable height adjusting mechanism or, alternatively, the nut can be welded to a support pillar (B, C, D), vehicle floor or to a part of a seat frame. Inspection of the prior art will show the plate or wire loop rotates perpendicularly to the longitudinal axis of the bolt. Recent safety legislation has addressed the potential for head trauma within the vehicle passenger compartment. In response to this, the plastic covers, which provide a decorative trim over the head of the bolt and a portion of the web guide plate, have been modified to include deformable plastic parts. These parts, when deformed, absorb impact energy and reduce the possibility of serious head trauma to the occupant.

It is an object of the present invention to provide an anchor or web guide assembly in which both the bolt and a web guide, that is, the member supporting the seat belt webbing, are resiliently moveable relative to a mounting surface (which would include for example: a height adjuster, a support pillar, floor or seat frame). Additionally, it is an object of the present invention to provide a web guide assembly in which the member supporting the seat belt webbing can rotate in three directions relative to the mounting bolt. These increased degrees of freedom further lessen the possibility of head trauma and, in addition, permit the web guide to self adjust to a position that is defined by the entry and exit angles of the seat belt webbing. A benefit of this feature is the webbing moves through a less tortuous path, which reduces the friction in the system, lessening the chance of causing roping (a bunching up) of the webbing in a corner of the webbing slot, further reduces the chance of dumping, that is, 90 degree rotation of the web guide, which increases the chance of roping. The benefits of the invention also allow for uniform loading of CFR (energy absorbing) retractors in the event of an accident Accordingly the invention comprises: an energyabsorbing anchor or web guide assembly comprising a web guide for slidingly supporting a section of a seat belt; and mounting means for mounting the web guide to a mounting surface and for permitting the web guide to resiliently move, in response to input forces, between a first position and a second position. In the preferred embodiment a mounting bolt is also resiliently movable.

Many other objects and purposes of the invention will be clear from the following detailed description of the drawings.

DETAILED DESCRIPTION OF THE DRAWINGS

Figure 1:
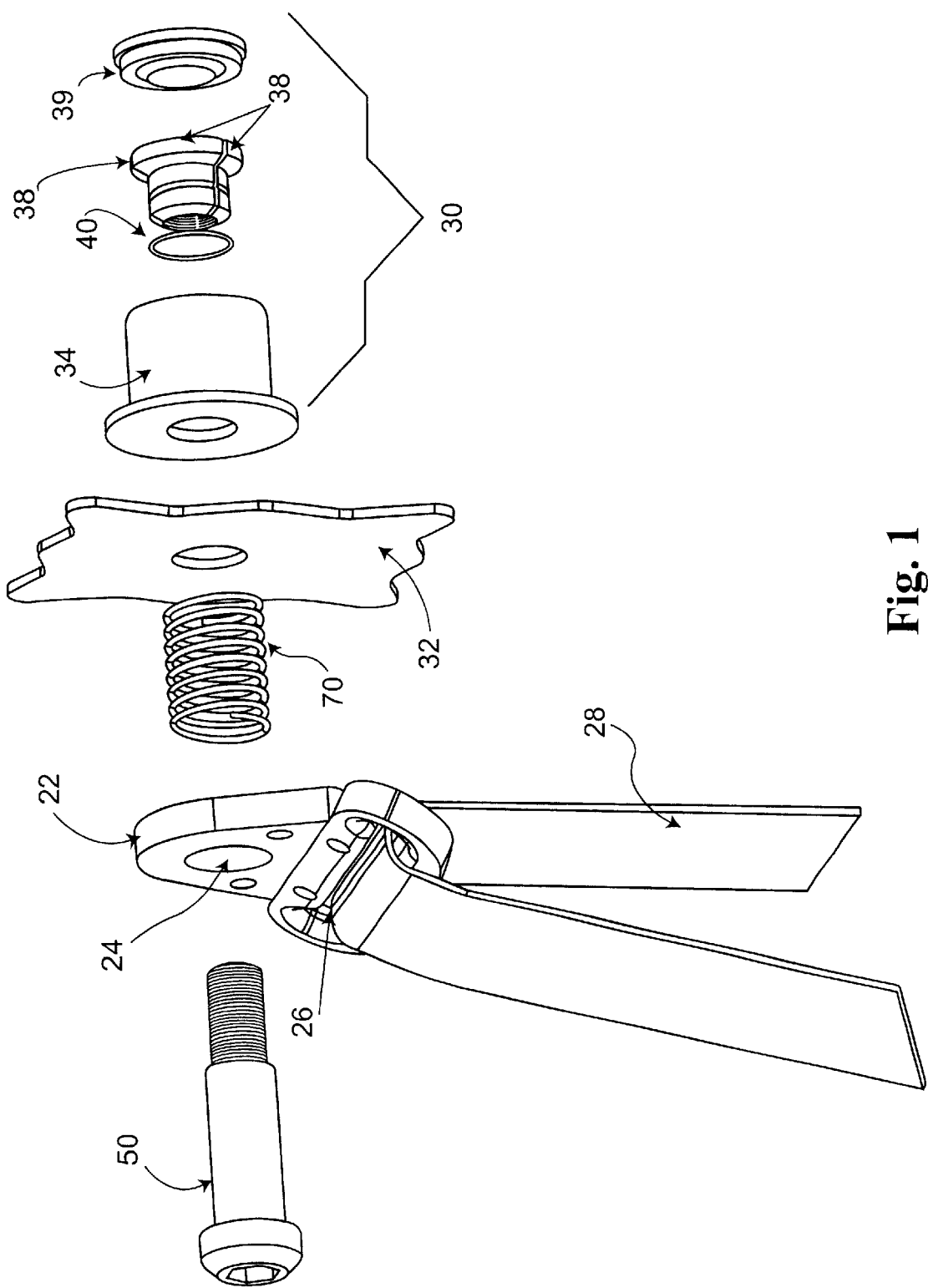
FIG. 1 is an assembly view of the present invention.
Figure 2A:
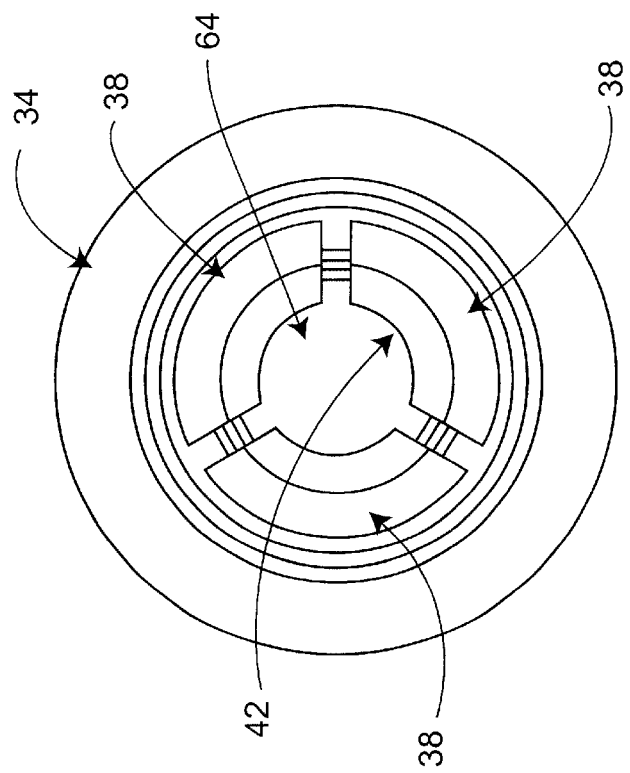
FIG. 2A is a cross-sectional view through Section 2a—2a of FIG. 2.
Figure 1A:
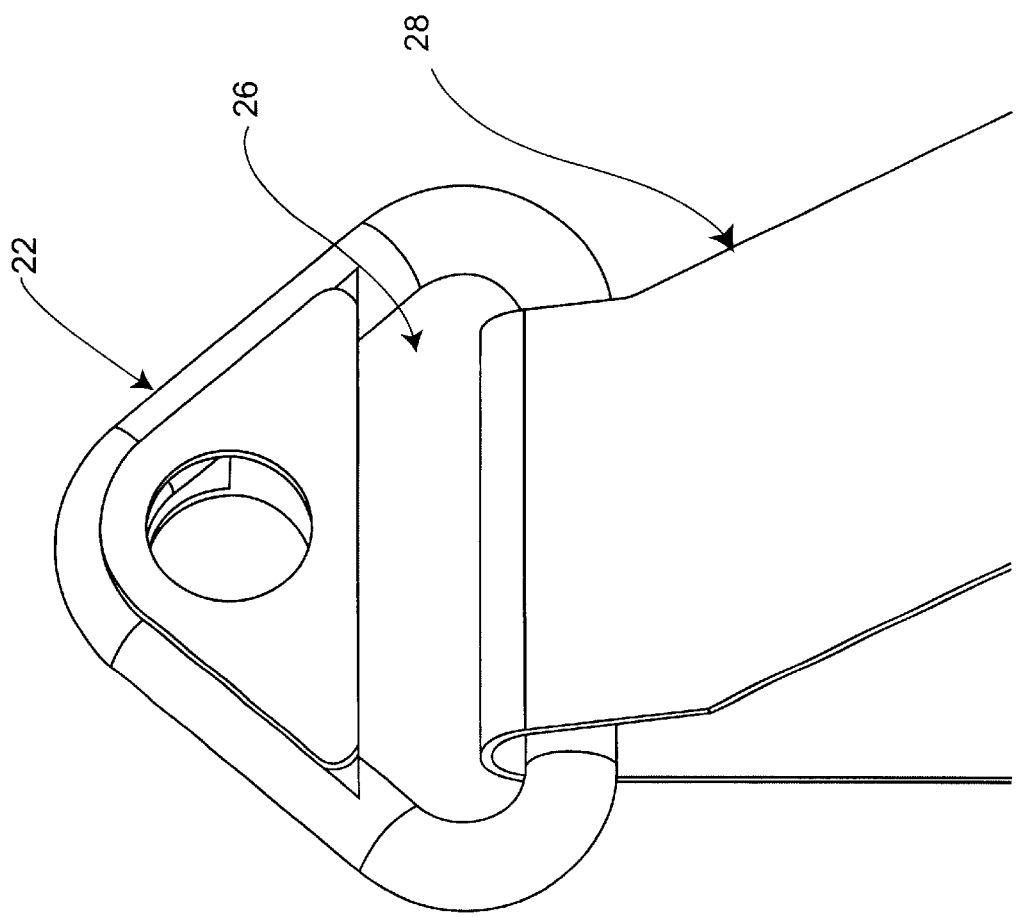
FIG. 1A shows an alternate web guide.

Reference is made to FIG. 1, which shows a web guide assembly 20 comprising a web guide 22 formed of a load-bearing plate or loop of wire (see FIG. 1a), or other construction as known in the art. The web guide includes a mounting opening 24 and a narrow slit or larger opening 26 to receive a portion of the shoulder belt (or other portion) 28 of a seat belt system, which comprises at least a retractor, a seat belt, a buckle and tongue. The assembly 20 includes a first mounting connector 30, which is secured to a support surface 32 (shown in phantom line) and a second mounting connector such as a shoulder bolt 50. The first mounting connector 30 holds the bolt 50 so that it cannot be pulled out but permits the bolt to be pushed inwardly under load such as by an impact with an occupant. The bolt 50 is received through a slightly oversized opening 24 in the web guide, which permits the web guide 22 to wobble about the bolt 50, that is, to move in three dimensions relative to the bolt. Additionally, a spring 70 resiliently bears against a rear surface of the web guide 22, which returns the web guide to its initial position after the impact force is removed. In the context of the present invention, the support surface 32 can be a portion of an adjustable height adjuster, a pillar or floor of a vehicle, a support frame of a seat or other similar support mechanism within the vehicle. In some embodiments of the invention, the first mounting connector 30 is a quick-acting nut or coupling such as shown in U.S. Pat. Nos. 4,378,187 or 5,427,488, each of which is incorporated herein by reference. Other embodiments use a conventional nut. Additionally, a spring 70 resiliently bears against a rear surface of the web guide 22.

Figure 2:
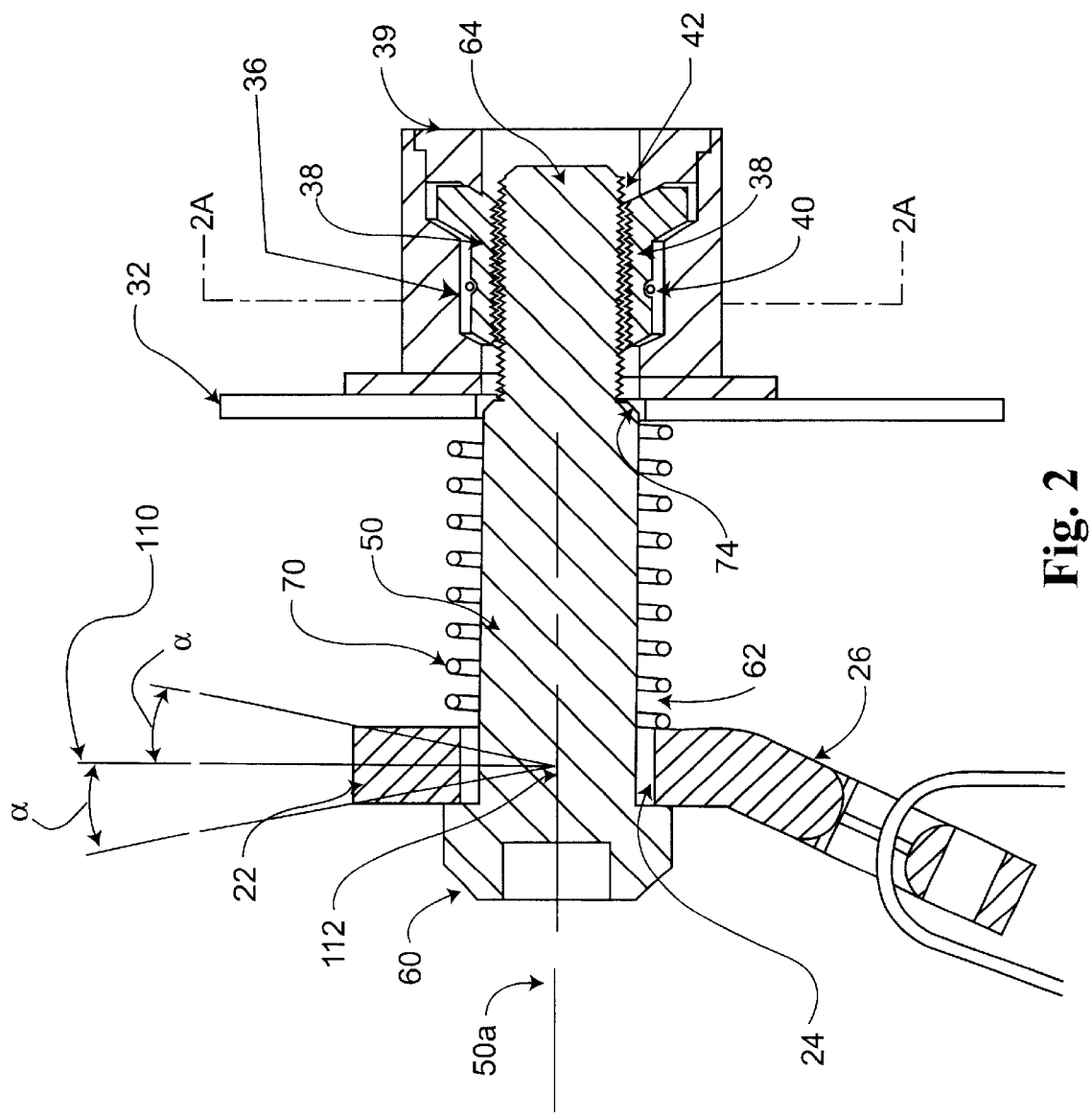
FIG. 2 is a cross-section of an assembled web guide assembly.

As can be seen from FIG. 2, a quick-acting nut such as 30 includes a body 34, having a central bore 36. Positioned within the bore is a plurality of internally threaded segments 38, each of which is radially moveable relative to the body 34. These segments are bound together by a resilient connection 40, such as by a preformed cut wire spring (which is not shown in the prior art). The segments 38 are positioned to define a central opening 42 for receipt of the second mounting connector, that is, the bolt 50. The segments 38 are held to the body 34 by a washer or end member 39 that is threaded, welded or swedged in place. In the first embodiment of the invention, the second mounting connector, that is, shoulder bolt 50 has a head 60, an unthreaded large diameter portion 62 below the head and a smaller diameter, threaded portion 64. The bolt 50 includes a tapered shoulder 74 joining the unthreaded and threaded portions 62 and 64 respectively. The spring 70, can be a helical spring but any resilient member of deformable material can be used. For example, the deformable material can be a cylindrical tube of resilient plastic (with the bolt received therethrough) or a wave washer. The spring is received upon the unthreaded portion 62 of the bolt and resiliently biases the rear surface 22 of the web guide.

The nut 30 is secured to a support mechanism or member 32 (see FIG. 2) by welding or the like. One of the advantages of using the quick-acting nut 30 is that the bolt 50 can be secured to the nut without turning the nut, thereby speeding production, lowering cost and lessening any repetitive hand or arm trauma to the worker who had previously rotated the bolt or screwed the bolt in place. During assembly, the bolt 50 is inserted through the opening 24 and the spring 70 placed on the bolt. The threaded portion 64 of the shoulder bolt is inserted within opening 42 of the nut 30. As the bolt is inserted the threads of the bolt push the nut segments radially outwardly, which permits the bolt to slide therein. The shoulder bolt is preferably initially inserted such that the full length of its threaded portion is received within the various segments 38 of the nut. In this position the tapered shoulder 74 would reside adjacent the forward tip of each segment 38. FIG. 2, however, shows that a portion of these bolt threads have not been fully pushed within the nut 30.

During an accident, an occupant's head may impact upon the web guide 22 or upon the head 60 of the bolt 50 or both. Consider first if only the web guide 22 is impacted and the impact force is above the threshold force level of spring 70. In this condition the web guide will move resiliently inward, against the bias force of spring 70, without affecting the position of the bolt 50, lessening any impact to the occupant. If, for example, the head impacts with a lower portion of the web guide, it will rotate downwardly (see angle "a" in FIG. 2). Numeral 50a designates the longitudinal axis of the bolt. As can be seen in FIG. 2, because of the oversized dimension of opening 24, the web guide 22 can rotate freely about three axes relative to the bolt 50. For example, the web guide can rotate about another axis 110 (a vertical axis), which is perpendicular to the longitudinal axis of the bolt, as well as about a horizontal second axis 112. Additionally, the web guide can rotate about the longitudinal axis 50a.

Figure 3:
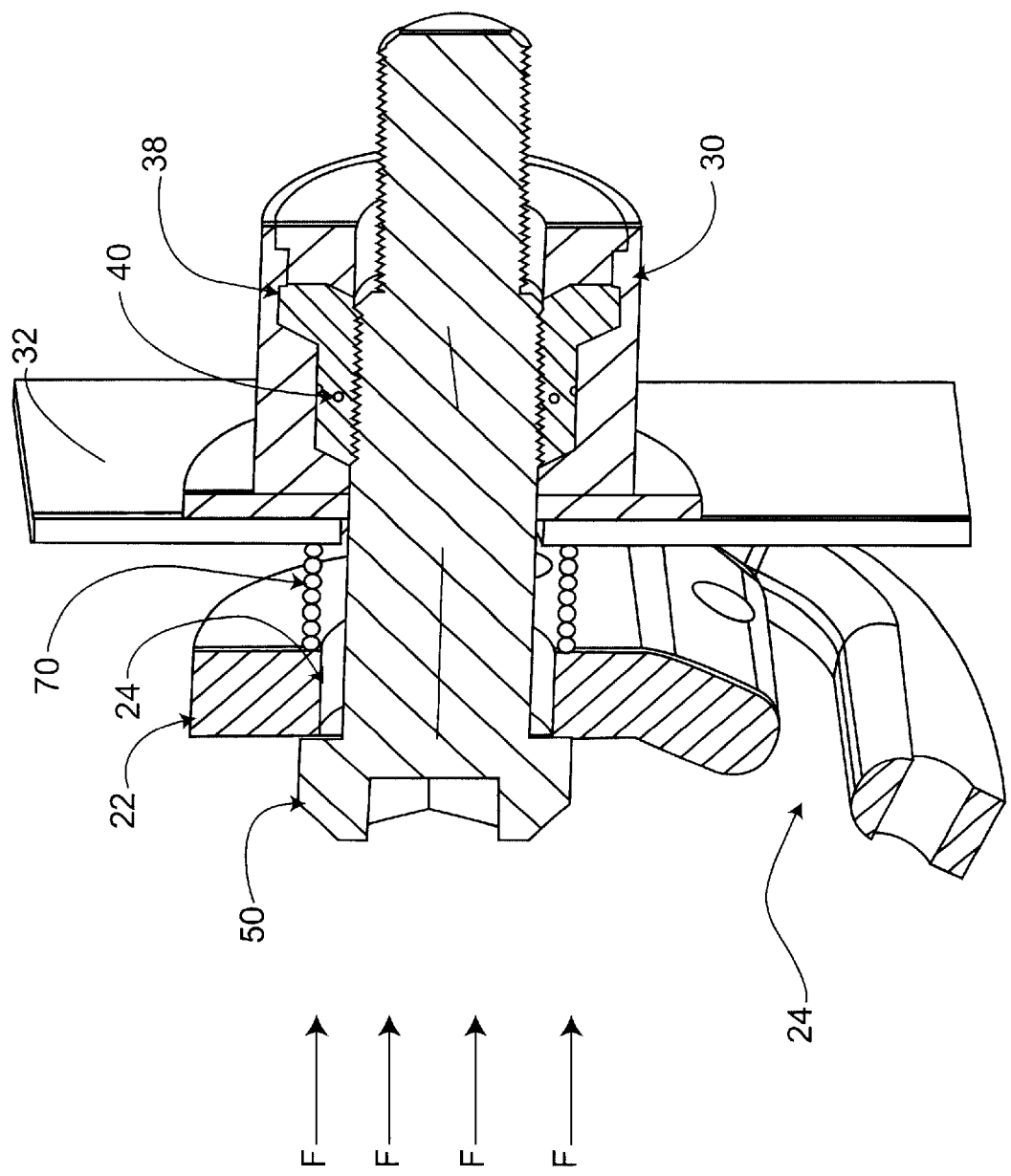
FIG. 3 shows the web guide assembly in an axially deflected position in response to an axial force.

If the head impacts on a side of the web guide, it will rotate side-to-side. If, on the other hand, the occupant impacts the bolt head 60, the web guide assembly also acts in an energy-absorbing mode as the bolt 50 will be moved inwardly against the force of the spring 70. More particularly during impact, any threaded portions of the bolt 50 that are upstream of the segments 38 will move inwardly and ratchet upon the threads on the face of each of the segments 38. Thereafter, the unthreaded angled shoulder 74 will engage the segments 38, urging the segments 38 outwardly (in view of the increasing diameter of the shoulder and angled internal surfaces of the nut) thereby enlarging the diameter of central opening 42. If the impact is sufficiently high, the unthreaded portion 62 of the bolt 50 will enter this enlarged opening 42 in the nut in opposition to the reaction force provided by the spring or other resilient member 70, thereby absorbing a higher level of energy (see FIG. 3, which shows bolt 50 pushed into the nut 30). The various segments 38 of the nut 30 will not lock on the smooth, unthreaded portion 62 of the bolt. Consequently, when the impact force is removed from the bolt 50, the spring 70 returns bolt 50 and the web guide 22 to their extended, initial positions. The spring-loaded segments 38 will also seek their initial positions as well, under the influence of the angled surfaces within the nut body 34 and bias spring 40, and they will lock onto one or more threaded portions of the bolt 50 preventing the bolt 50 from being pulled out.

Figure 4:
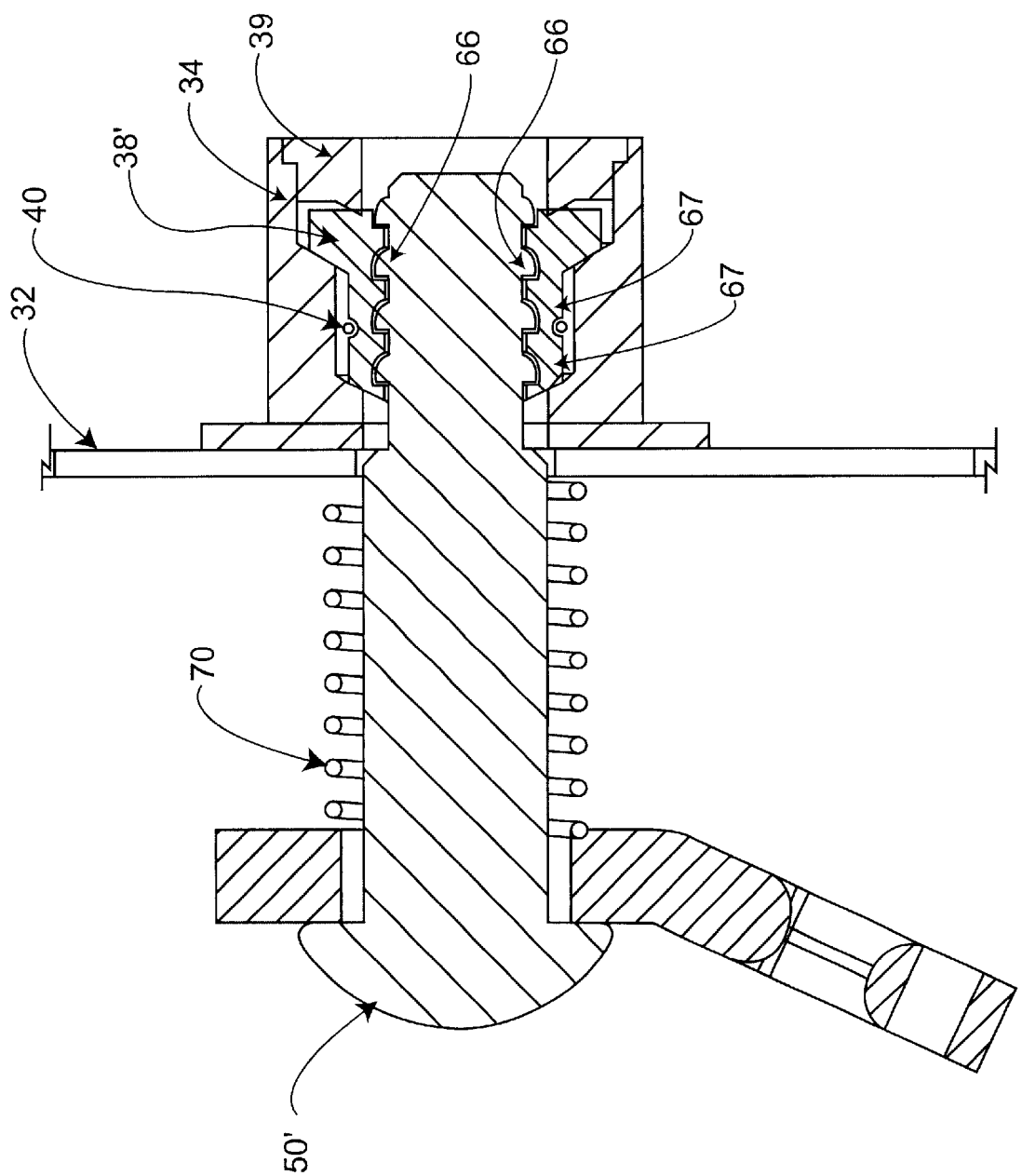
FIGS. 4 and 5 show an alternate embodiment of the invention.
Figure 5:
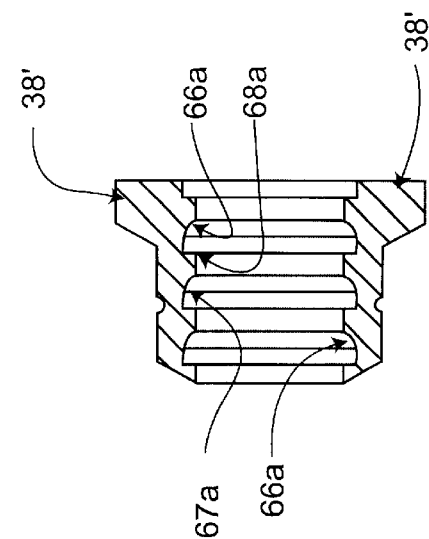

FIG. 4 shows an alternate mounting bolt 50', which is in essence similar to bolt 50. However, the threads have been removed from segment 64 and replaced with a series of staged or sequential annular rings 66, which are preferably of the same diameter but these diameters can vary. Each ring is separated by a groove 65. The leading surface 67 of each ring is curved, which mates with a like-shaped groove surface 67a on the nut. The curved profiles of the rings and grooves 66a permit the bolt 50' to be pushed within the bolt and the segments 38 ratchet upon the rings 64a. The rear surface 68 of each ring and the rear surface 68a of each groove are flat, which prevents the bolt from being pulled out of the nut. FIG. 5 shows an alternate embodiment of one of the spring-loaded nut segments designated as 38'. In the earlier embodiment, the interior radial face of each segment 38 was threaded to matingly engage the threads on the bolt 50. The interior face of the alternate segments 38' will include a plurality of grooves 67, which receive their respective one of the projecting rings 64a on the ringed portion 64' of the bolt 50'.

Figure 6:
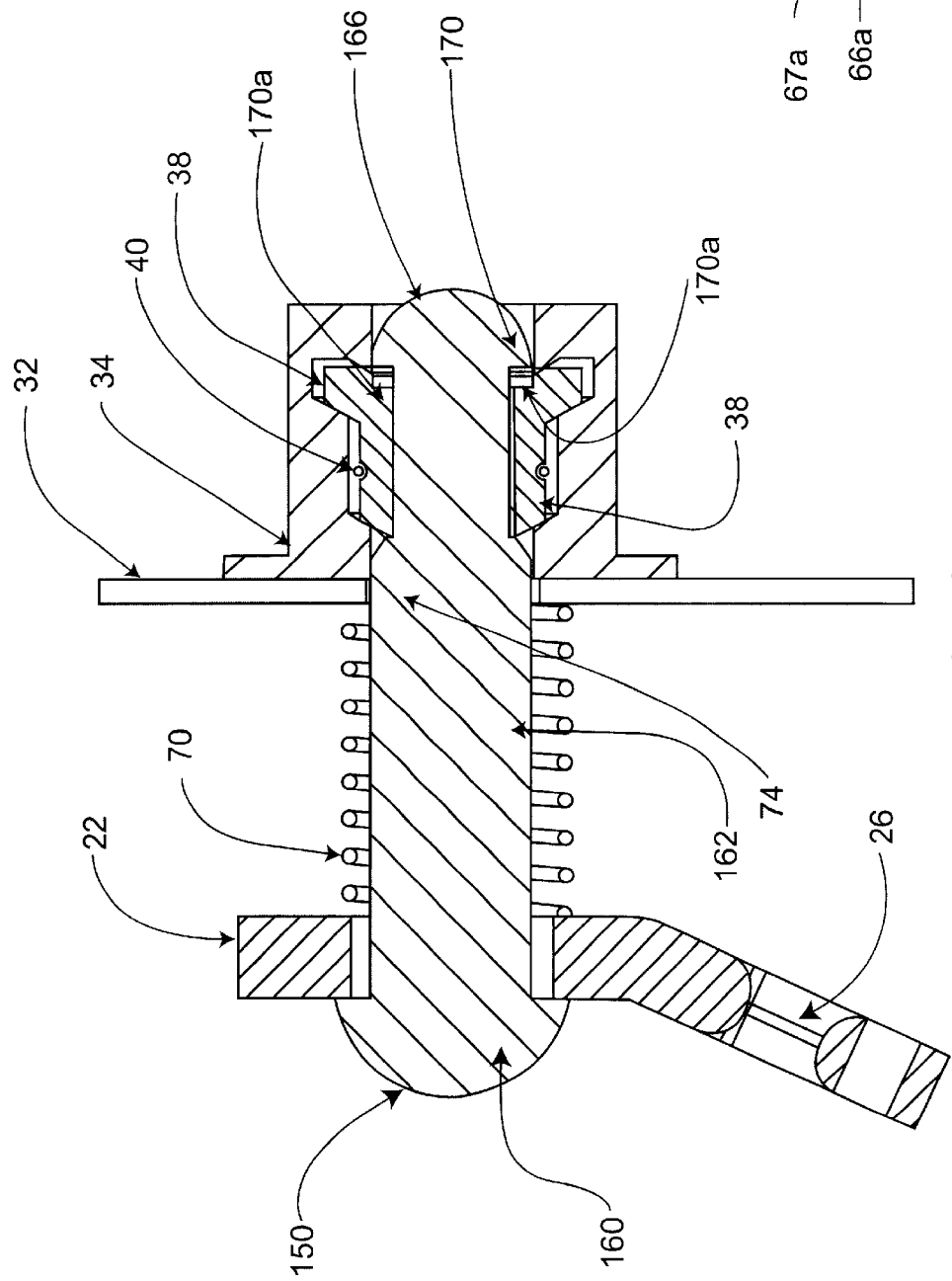
FIGS. 6 and 7 show a further embodiment of the invention.
Figure 7:
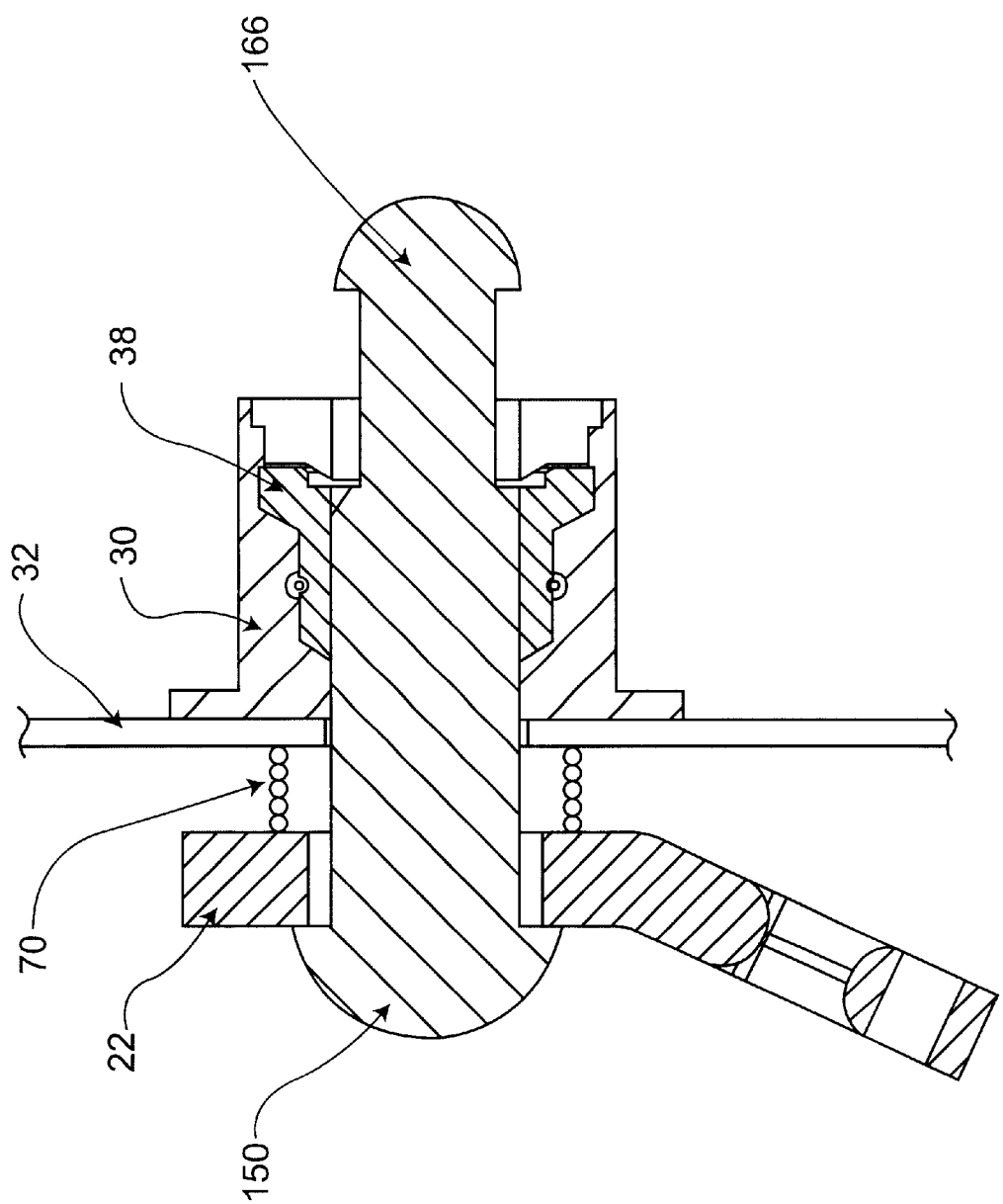

Reference is made to FIGS. 6 and 7, which show another embodiment of the invention in which the interior surface of each segment 38 is smooth. (The threads or grooves of each of the segments 38 have been removed.) The segments 38 are still spring loaded toward the center, as mentioned above, by ring 40. The web guide 22 and spring 70 remain the same as in the earlier embodiments, however, the shape and function of the second mounting member 150 has changed. The mounting member 150 is essentially a pin rather than a shoulder bolt and includes a head 160 with a wide diameter portion 162 followed by a narrow diameter portion 164. The end 166 of the fastener or mounting member opposite the head is formed with a smooth surface such as a spherical-shaped tip 168. A severely angled shoulder 170 connects the narrow diameter portion 164 with the end 166. During insertion of the mounting member 150 into the nut 30, the spherical end 166 pushes the locking segments 38 outwardly. Upon further insertion of the pin 150, past shoulder 170, the segments 38 collapse upon the narrowed diameter portion 164. The angled surfaces on the other faces of each of the segments 38, in cooperation with the complementary angled faces of the body 34 of the nut, generate inwardly directed reaction forces, which keep the segments 38 in the position as shown even when a force is applied to pull the pin out of the nut 30. The shoulder 170, in cooperation with the groove segment 170a on each segment, prevents the pin from being pulled from the nut.

The web guide 22 is moveable about the pin 150 in the same manner as it was moveable about the shoulder bolt 50. In addition, in the event of an impact on the head 160 of the mounting member 150, inward movement of the ramp 74 urges the segments 38 apart, allowing the larger diameter portion 162 of the pin to penetrate (see FIG. 8) into the body 34 of the nut during which time the spring 70 absorbs energy of the impact. Once the impact force of the body part is removed from the connector 150, the spring 70 returns the D-ring and the connector 150 to its extended position.

Figure 11:
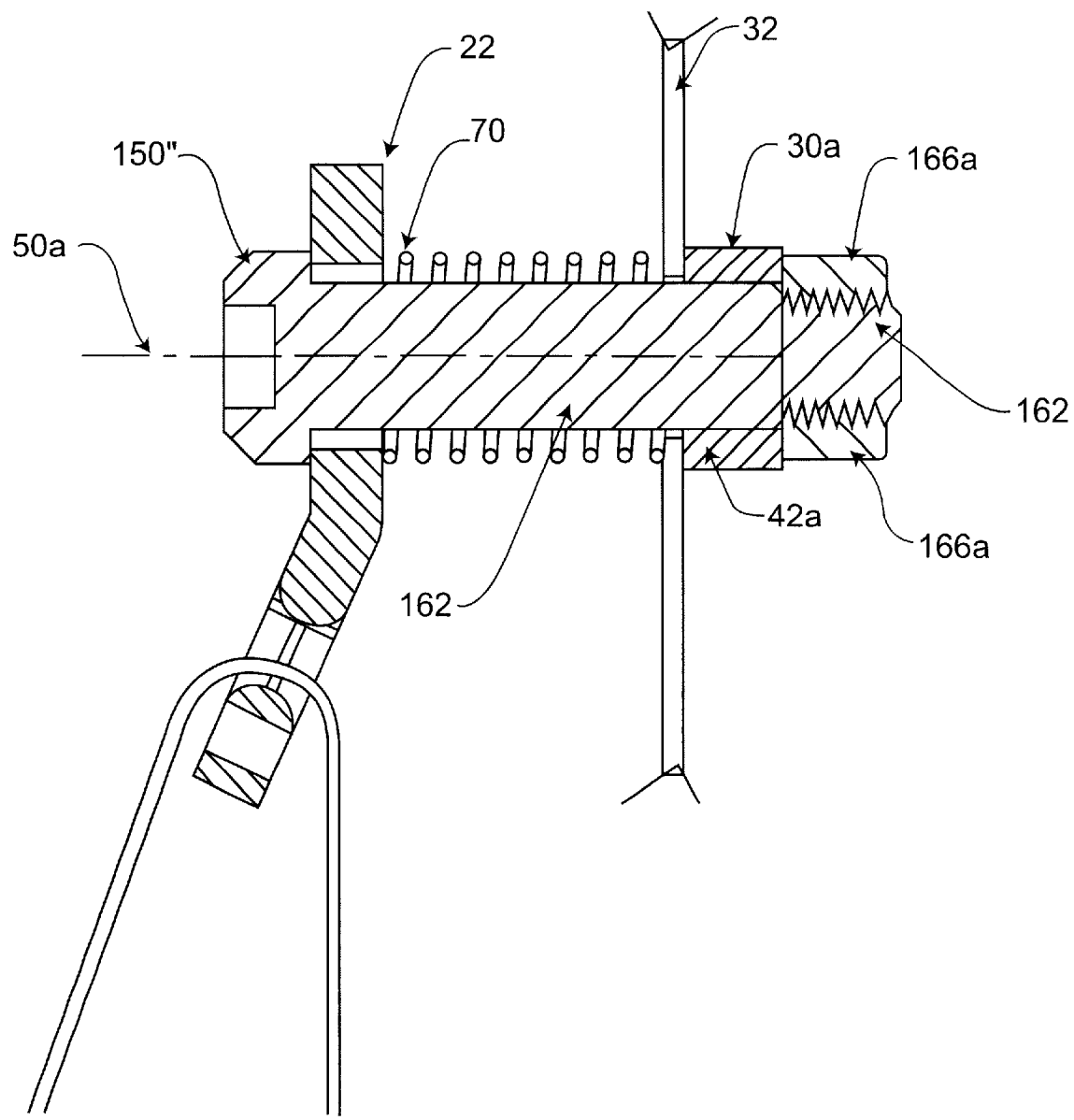
FIGS. 11 and 11A show another embodiment of the invention.
Figure 11A:
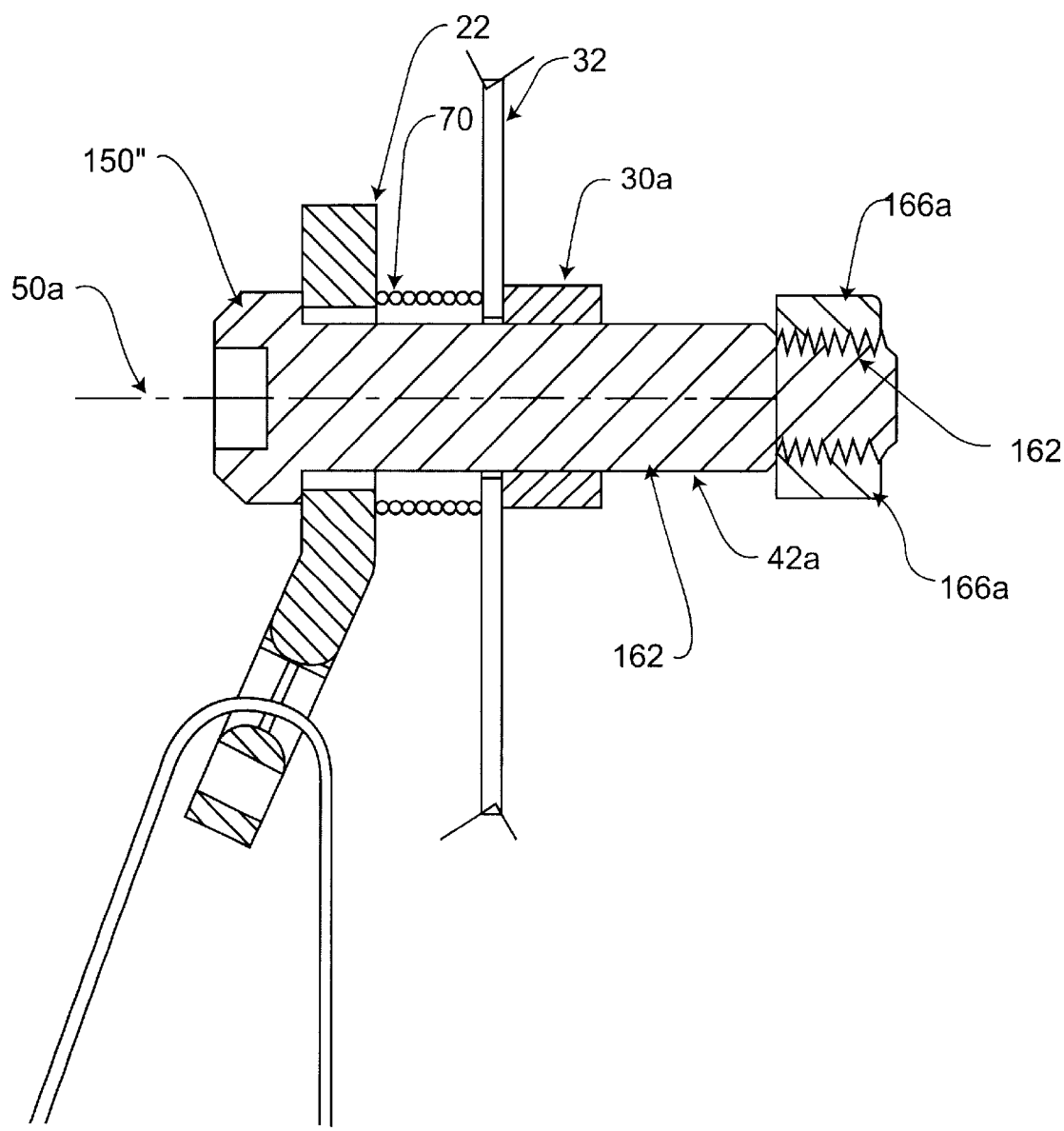

FIGS. 11 and 11a show a variant of the above embodiment in which the nut 30 has been replaced with a bushing 30a with a smooth bore 42a. The fastener (mounting member) 150" has a smooth body but includes threads 162 at a tip. A threaded nut 166a is secured to the fastener 150". The bushing stabilizes the fastener 150" about axis 50a. When the web guide is hit it will slide within the bushing 150". The oversized nut 166a prevents the fastener 150"

from being pulled through the mounting surface. When impacted, the web guide will be pushed inwardly as shown in FIG. 11a.

Figure 8:
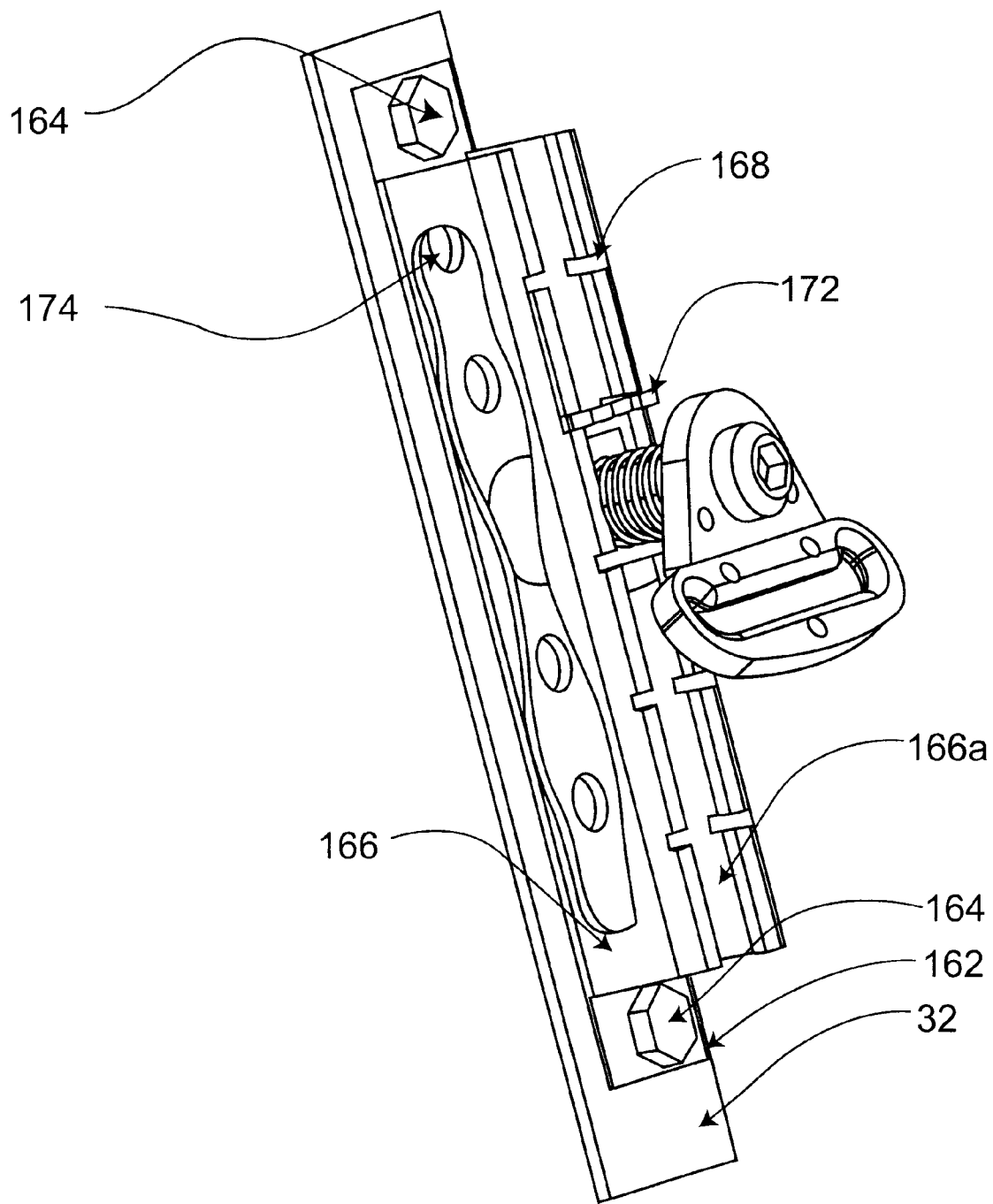
FIG. 8 shows a height adjuster incorporating the present invention.

The following embodiments apply the present invention to a height adjusting mechanism used in seat belt systems. In FIG. 8 a resilient bolt and web guide are mounted to a height adjuster 160, which is hard mounted to a mounting surface such as a B-pillar or seat frame part 32. The basic components of a height adjuster, that is, a carrier and a frame are shown in U.S. Pat. No. 5,050,907, which is incorporated herein by reference. The height adjuster 160 has ends 162, secured by bolts or other fasteners 164 to the mounting surface 32. The height adjuster includes a frame or rail 166 with a plurality of locking features such as a plurality of pairs of facing slots 168 thereon. Slidably moveable on the frame is a carrier (in essence a sliding block) 170 having a manually movable locking feature such as a latch 172, which interacts with selected slot(s) to lock the carrier in place. The slots 168 can be replaced by openings 174 in a base of the rail and the latch replaced by a lock pin. The latch 172 or lock pin is movable into and out of a selected one of locking features on the frame. The means by which the latch or pin can be moved or latched varies and is well known. The latch engages a selected one of the slots or openings 168 to hold the carrier at a comfortable and convenient position for a particular occupant. In the earlier embodiment the quick-acting nut or bushing 30a was secured to a mounting surface in the form of a pillar surface. In this embodiment the nut or bushing is secured and moveable with the carrier (of the height adjuster) as are the remaining portions of the web guide assembly 20. When for example the bolt 150 or pin 150' is impacted, it will move inwardly against the bias force of the spring 70. Provision must be made to prevent the bolt or pin from impacting the frame or mounting surface. For example, the spring constant can be sufficiently high to limit inward movement of the pin. Alternately, the frame 166 and mounting surface 32 can each include oversized openings 174 into which the bolt or pin can slide when it is pushed inwardly. A further, alternate of the invention whose purpose is to also prevent the bolt from interacting or impacting with the frame is to make the sides 166a of the frame sufficiently high. In this manner when the bolt is depressed it will not extend far enough to impact the bottom of the frame.

Figure 9:
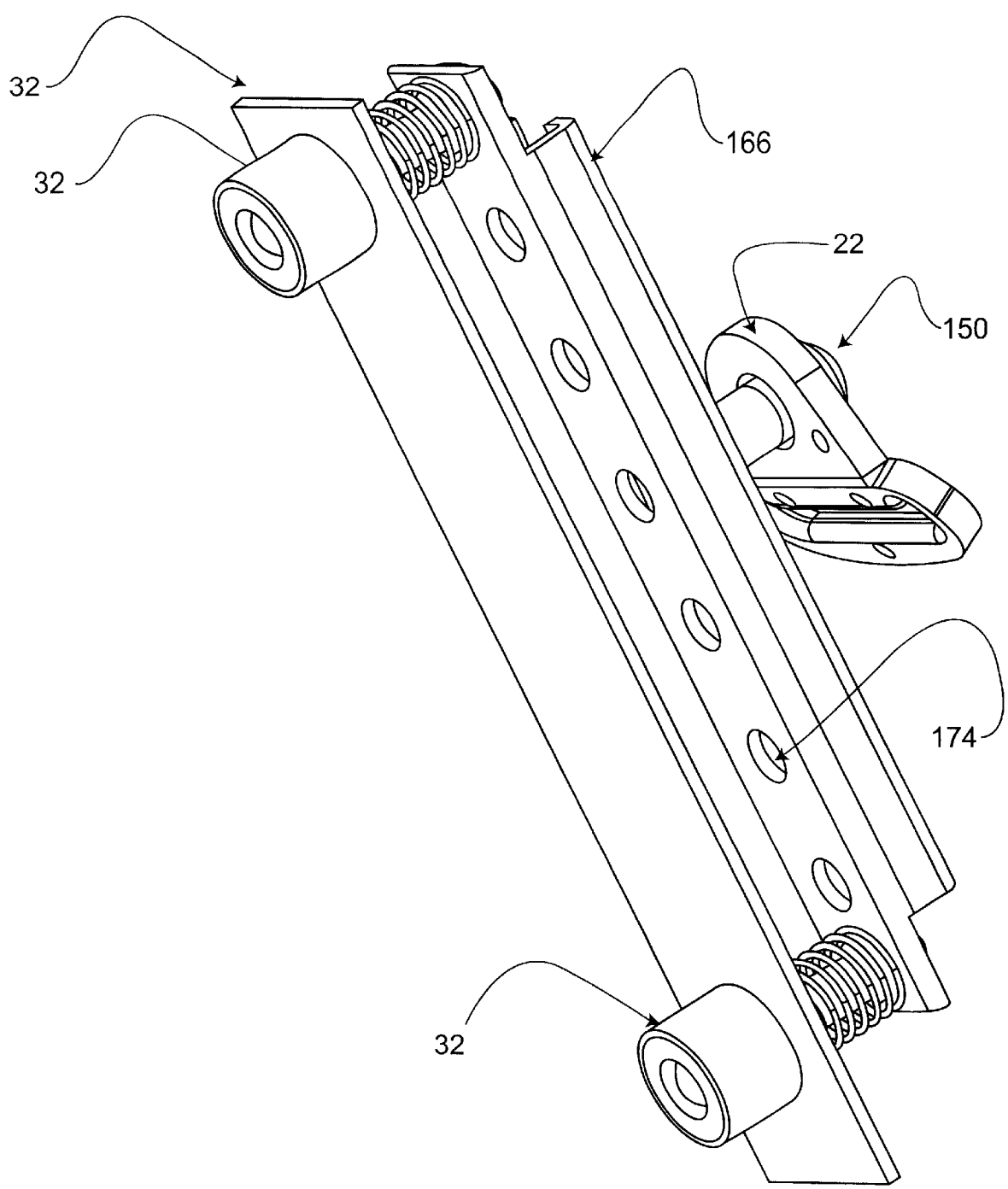
FIG. 9 shows an alternate height adjuster.

Reference is made to FIG. 9, which shows an alternate construction of the present invention. The height adjuster 160 includes the frame 166 with locking features 168, as well as a carrier 170. The hard mounting of the frame 166 is replaced with a resilient connection. Any of the methods for mounting the fasteners or mounting members mentioned above can be employed with this embodiment. For example, two quick-acting nuts 30 (or bushings 30a ) are mounted to the mounting surface 32 and two shoulder bolts 150 are received therein in a manner similar to that described above. As can be appreciated the bolts are received through openings in the ends of the height adjuster frame 166 rather than through opening 24 in the web guide. Each of the springs 70 respectively bias the top and the bottom of the frame 166. When any portion of the web guide 22 or any portion of height adjuster is hit the entire frame 166 will move to compress one or both of the springs 70, absorbing energy as the springs compress. The bolt 150 shown securing the web guide 22 to the frame of the height adjuster can be hard mounted to the carrier 170 of the height adjuster or alternatively resiliently mounted as shown in FIG. 9.

Figure 10:
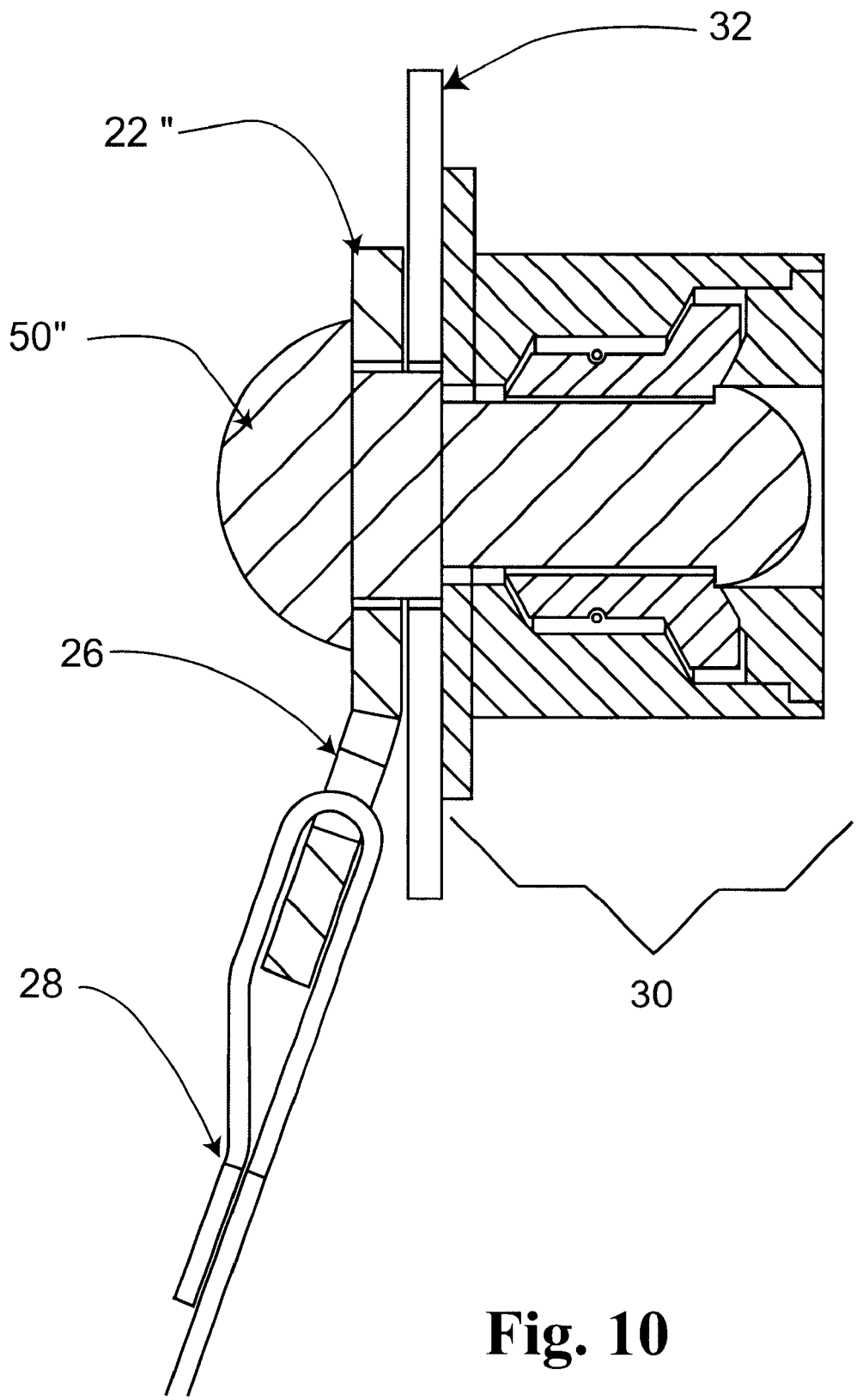
FIG. 10 shows an anchor, which incorporates the present invention.

Reference is briefly made to FIG. 10, which illustrates an anchor 22", which in concept is similar to the anchoring function provided by the web guide 22. The anchor 22" includes an opening 24 for receipt of a bolt (or pin or fastener) 50" and a slot 26 for receipt of a looped portion 28 of seat belt webbing (similar to the above web guide). Secured to or mounted within the mounting surface, such as the floor of the vehicle, is the quick-connect nut 30. The fastener 50" includes a shaft that can be smooth or threaded. Upon full insertion of the fastener 50" through the anchor and the nut 30, the anchor 22' is fastened to the mounting surface 32 without the need to torque the fastener down. As can be appreciated, the above facilitates and speeds installation of the various parts that have been secured by a threaded connector.

Many changes and modifications in the above-described embodiment of the invention can, of course, be carried out without departing from the scope thereof. Accordingly, that scope is intended to be limited only by the scope of the appended claims.

What is claimed is:

1. An energy absorbing web guide assembly comprising:
a web guide for supporting a section of a seat belt; and
mounting means, including a single first mounting connector linked to the web guide and a second mounting connector operatively mounted to a mounting surface, for resiliently mounting the web guide and the first mounting connector to the mounting surface and for permitting only the web guide and the first mounting connector to resiliently move in an axial direction, in response to forces input thereto, between a first position and a second position.

2. The web guide as defined in claim 1 wherein the web guide is movable axially relative to the first mounting connector.

3. An energy absorbing web guide assembly comprising:
a web guide having an opening to support a section of a seat belt, the web guide including a mounting opening; and
a quick-acting nut mounted to a mounting surface, which includes a pillar of a vehicle, the quick-acting nut including a plurality of serrations on a resiliently movable portion thereof; and
a shoulder bolt, received through the mounting opening of the web guide and lockingly received within the quick-acting nut.

4. The web guide assembly as defined in claim 3 wherein the shoulder bolt includes a threaded section received within the nut.

5. An energy absorbing anchor assembly comprising:
an anchor including a web guide for supporting a section of a seat belt; and
mounting means for resiliently mounting the web guide, in a longitudinal direction, relative to a mounting surface, the mounting means including;
a fastener cooperable to support the web guide, the fastener including a longitudinal axis and the fastener movable in the longitudinal direction, the fastener including a mounting end;
a nut adapted to be mounted about a mounting opening in the mounting surface, the nut including firs portions which secure the mounting end of the fastener from movement when the fastener is in a first position, the first portions of the nut outwardly movable under load to disengage with the fastener and permit the fastener to move relative to the first portions of the nut in the longitudinal direction to a second position;
a spring for biasing the one of the web guide and fastener to move toward the first position.

6. The assembly as defined in claim 5 wherein the first portions of the nut are generally fixed from movement in the longitudinal direction and movable outwardly in a radial direction.

7. The web guide assembly as defined in claim 6 wherein the web guide is mounted to rotate about the longitudinal axis.

8. The web guide assembly as defined in claim 6 wherein the web guide is mounted to rotate about an axis that is generally perpendicular to the longitudinal axis.

9. The web guide assembly as defined in claim 6 wherein the mounting means includes a resilient member operatively linking the first mounting connector to the second mounting connector.

10. The web guide assembly as defined in claim 9 wherein the spring is connected between a rear surface of the web guide on one side of the spring and a fixedly located opposing surface on another side of the spring.

11. The web guide assembly as defined in claim 6 herein at least a portion of the second mounting connector is one of threaded and ribbed.

12. The web guide assembly as defined in claim 11 wherein the first portion of the nut resists movement of the fastener out from the nut.

13. The assembly as defined in claim 6 wherein the fastener includes a threaded narrow diameter portion received within the first portions of the nut, a larger diameter portion and a transition portion between the narrow and larger diameter portions, wherein the first portions of the nut are moved outwardly upon engagement with the transition portion of the fastener as the fastener moves in the longitudinal direction.

14. The assembly as defined in claim 13 wherein the spring is received about the larger diameter portion of the fastener.

15. The assembly as defined in claim 13 wherein the first portions of the nut include threads which lockingly connect to the narrow portion of the fastener when the fastener is in the first position.

16. The assembly as defined in claim 13 wherein the first portions of the nut and the narrow diameter portion of the fastener includes mating rings.

17. The assembly as defined in claim 6 wherein the mounting end of the fastener includes a head having a first profile sufficient to cause the first portions of the nut to move outwardly when the head is moved therethrough, the fastener also including a narrow diameter portion downstream of the head and which is slidably received within the first portions of the nut, a larger diameter portion and a transition portion between the narrow and larger diameter portions, wherein the first portions of the nut are again moved outwardly upon engagement with the transition portion of the fastener when the fastener moves in the longitudinal direction.

18. The assembly as defined in claim 17 wherein the head once pushed through the first portions of the nut, mate with engaging surfaces of the nut to prevent the fastener from being dislodged from the nut.

19. An energy absorbing anchor assembly comprising:

an anchor mechanism; and mounting means for mounting the anchor to a mounting surface, the mounting means including;

a fastener cooperable to support the anchor, the fastener including a longitudinal axis and the fastener movable in the longitudinal direction, the fastener including a mounting end;

a nut adapted to be mounted about a mounting opening in the mounting surface, the nut including first portions which secure the mounting end of the fastener from movement when the fastener is in a first position, the first portions of the nut outwardly movable under load to disengage with the fastener and permit the fastener to move relative to the first portions of the nut in the longitudinal direction to a second position.

* * * * *